(12) United States Patent
Hyun (10) Patent No.: US 9,572,334 B2
(45) Date of Patent: Feb. 21, 2017

(54) FISHING REEL EQUIPPED WITH HIDDEN LINE STOPPER

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD (KR)

( * ) Notice: Subject to any disclaimer, the term of this patent is extended or adjusted under 35 U.S.C. 154(b) by 0 days.

(21) Appl. No.: 15/071,509

(22) Filed: Mar. 16, 2016

(65) Prior Publication Data

US 2016/0270382 A1    Sep. 22, 2016

(30) Foreign Application Priority Data

Mar. 16, 2015  (KR) .................. 10-2015-0035701

(51) Int. Cl.
*A01K 89/01*    (2006.01)
*A01K 89/02*    (2006.01)

(52) U.S. Cl.
CPC .................... *A01K 89/02* (2013.01)

(58) Field of Classification Search
CPC ............ A01K 89/015; A01K 89/01921; A01K 89/01922; A01K 89/01923
See application file for complete search history.

(56) References Cited

U.S. PATENT DOCUMENTS

| 5,873,535 | A | * | 2/1999 | Jeung | A01K 89/015 242/310 |
| 6,460,793 | B1 | * | 10/2002 | Hirayama | A01K 89/015 242/313 |
| 2007/0246590 | A1 | * | 10/2007 | Hyun | A01K 89/015 242/310 |
| 2013/0320125 | A1 | * | 12/2013 | Hyun | A01K 89/015 242/312 |
| 2014/0158803 | A1 | * | 6/2014 | Hyun | A01K 89/015 242/310 |

FOREIGN PATENT DOCUMENTS

| KR | 101273653 | 6/2013 |
| KR | 101418030 | 7/2014 |
| KR | 101492200 | 2/2015 |

* cited by examiner

*Primary Examiner* — Emmanuel M Marcelo
(74) *Attorney, Agent, or Firm* — Cantor Colburn LLP (57) ABSTRACT

Provided is a fishing reel equipped with a hidden line stopper. The fishing reel includes: a frame; a shaft mounted on the frame; a spool fitted on the shaft to keep a fishing line wound thereon; a first side cover disposed at a side of the frame and capable of opening to separate the spool; a second side cover coupled to the frame at the opposite side to the first side cover; a locker having a locking rod for locking and unlocking by moving forward and backward through the frame and the first side cover, and a grip disposed at the first or second side cover and connected to the locking rod; and a line stopper formed at the locking rod to be hidden or exposed when the locking rod is moved forward and backward to open and close the first side cover.

4 Claims, 8 Drawing Sheets

FISHING REEL EQUIPPED WITH HIDDEN LINE STOPPER

BACKGROUND OF THE INVENTION

Field of the Invention

The present invention relates to a fishing reel equipped with a hidden line stopper. Fishers generally fix a fishing line on a tension nut or leg (for mounting a reel to a fishing rod) after knotting it to prevent the fishing line wound on a spool from unwinding when they do not use fishing rods, but it is inconvenient and the knot is typically very weak. Using a specific device for fixing a fishing line may result in a change in structure of fishing reels, so it is bad in terms of common use and price competitiveness. Therefore, the present invention relates to a fishing reel equipped with a hidden line stopper that includes a loop or hook type line stopper on a locking rod of a locker for fixing a palm side cover so that when the locker is moved forward/backward, the line stopper is hidden or exposed to fix or release a fishing line in the line stopper.

Description of the Related Art

In relation to a method of keeping an unused fishhook during fishing or after fishing, there is Korean Patent No. 10-1273653 (registered on 4 Jun. 2013), titled "Fishing rod", by the applicant(s), which proposes a technique that makes it convenient to move or carry a fishing rod by using a holder for fixing a fishing line, a fishhook, and a sinker to prevent them shaking or sagging when moving or carrying the fishing rod and that can improve safety by preventing injury or damage due to the fishhook or the sinker.

Further, there is Korean Patent No. 10-1418030 (registered on 3 Jul. 2014), titled "Fishing reel equipped with hanger for fishhook and fishing rod using the same", by the applicant(s), which includes a reel body, a coupling portion formed on the reel body, a holder for holding a fishhook, and a counter-coupling portion coupled to the coupling portion, so it is possible to prevent damage to the fishing reel due to the fishhook by stably keeping the fishhook on a holder of a holding unit, to prevent injury of a user, and to ensure convenience for handling the fishing rod when the fishing rod is moved or carried.

Further, there is Korean Patent No. 10-1492200 (registered on 4 Feb. 2015), titled "Fishing reel equipped with hanger", by the applicant(s), which includes a reel body, a seat formed on the reel body, a holder for holding a fishhook, and a connecting portion coupled to the seat, so it is possible to prevent damage to the fishing reel due to the fishhook by stably keeping the fishhook on a holder of a holding unit, to prevent injury of a user, and to ensure convenience for handling the fishing rod with a reel when the fishing rod is moved or carried.

As described above, the applicant(s) has proposed various techniques that can fix a fishhook when it is not used.

On the other hand, if a fishing line (it may be referred as just a 'line' hereafter) is simply left alone when it is not used, the line comes out of a line guide due to rotation of a spool, so a user has to find the end of the line and put it into the line guide in order to start fishing later.

When a line is kept with a clutch off, a spool is rotated and the line is unwound like into a backlash state, so the line is badly entangled and it may become unusable.

Accordingly, in the related art, there is a method for keeping a fishing line wound on a spool under tension, whereby a fishing line is kept on a tension nut or a leg (for mounting a reel to a fishing rod) after knotting the line.

According to this method, it is inconvenient to knot and unknot a fishing line and the knot is typically very weak, and is some cases, it is required to cut off the knot in order to tie a fishhook for fishing, so the fishing line is wasted and it becomes a severe problem, particularly for an expensive fishing line.

Further, there is a method of taping the end of a line to a line winding portion of a spool, but in this case, it is inconvenient to remove the tape and put the line into a line guide in order to start fishing later, and the adhesive of the tape remains on the line and deteriorates the function of the line.

When a specific external line fixer is used, it is inconvenient to take off the line fixer and separately keep it during fishing, and the line fixer may be lost.

Further, when an internal line fixer or a line stopper is used, the size of a fishing reel has to be increased and the structure of a fishing reel may have to be changed, so it is a problem in terms of common use and price competitiveness.

Further, there is a method of tying a line to a line winding portion of a spool, but it requires separating the spool from a reel body in order to tie a line to the line winding portion of the spool and it is also required to untie or cut the line after separating the spool, mount the spool on the reel body, and then put the line into the line guide in order to start fishing after keeping the spool with the line tied on the reel body (it is not easy to keep the spool at another place), thus this approach is troublesome.

As described above, the methods of keeping a line under tension when a reel is not used in the related art all have defects.

SUMMARY OF THE INVENTION

An object of the present invention is to provide a fishing reel equipped with a hidden line stopper that makes it possible to quickly fix and release a line, prevent damage to a line, and ensure common use and price competitiveness without changing the shapes of basic reel parts such as a frame by including a loop or hook type line stopper on a locking rod of a locker for fixing a palm side cover, which opens/closes a side inlet for mounting a spool on the frame, to the frame so that when the locker is moved forward/backward, the line stopper is hidden or exposed to fix or release a fishing line in the line stopper.

Another object of the present invention is to provide a fishing reel equipped with a hidden line stopper that can prevent a line from being damaged by being stuck in between a frame or a side cover and a locker because the line stopper has a circular groove formed around a locking rod at a position close to or overlapping a loop or a hook.

Another object of the present invention is to provide a fishing reel equipped with a hidden line stopper that provides free selectivity for a user by including a separate auxiliary line stopper on a locking rod which is spaced from the line stopper.

In order to achieve the above object, according to one aspect of the present invention, there is provided a fishing reel equipped with a hidden line stopper that includes: a frame; a shaft mounted on the frame; a spool fitted on the shaft to keep a fishing line wound thereon; a first side cover disposed at a side of the frame and capable of opening to separate the spool; a second side cover coupled to the frame at the opposite side to the first side cover; a locker having a locking rod for locking and unlocking by moving forward and backward through the frame and the first side cover and a grip disposed at the first or second side cover and connected to the locking rod; and a line stopper formed at the locking rod to be hidden or exposed when the locking rod is moved forward and backward to open and close the first side cover.

The line stopper may include a loop or a hook formed at the locking rod.

The line stopper may further include a circular groove formed around the locking rod at a position close to or overlapping the loop of the hook.

The fishing reel may further include an auxiliary line stopper spaced from the line stopper at the locking rod.

According to the fishing reel equipped with a hidden line stopper, it is possible to quickly fix and release a line, prevent damage to a line, and ensure common use and price competitiveness without changing the shapes of basic reel parts such as a frame by including a loop or hook type line stopper on a locking rod of a locker for fixing a palm side cover, which opens/closes a side inlet for mounting a spool on the frame, to the frame so that when the locker is moved forward/backward, the line stopper is hidden or exposed to fix or release a fishing line in the line stopper. Further, since the line stopper has a circular groove formed around the locking rod at a position close to or overlapping a loop or a hook, it is possible to prevent a line from being damaged by being stuck in between the frame or the side cover and the locker. Further, an auxiliary line stopper spaced from the line stopper is further provided at the locking rod, so selectivity for users can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention is described hereafter in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

In the following description, when it is determined that well-known function and configuration may unnecessarily make the spirit of the present invention unclear, they will not be described.

Figure 1:
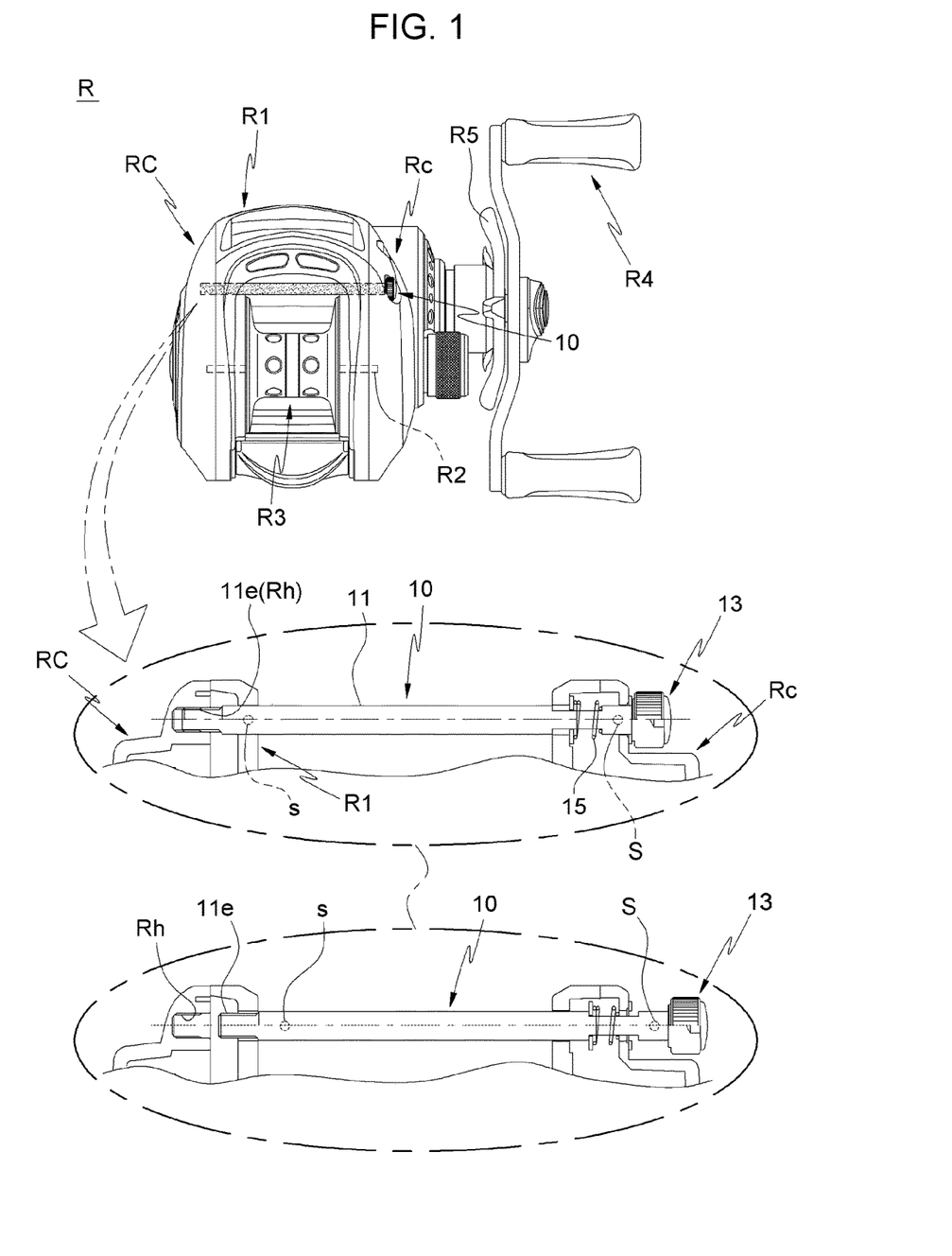
FIG. 1 is a plan view of a fishing reel equipped with a hidden line stopper according to an embodiment of the present invention.

Referring to FIG. 1 first, a fishing reel R according to an embodiment of the present invention includes a frame R1, a shaft R2 on the frame R1, a spool R3 fitted on the shaft to keep a fishing line wound thereon, covers RC and Rc at both sides of the frame, a handle R4, a tension nut R5, and a leg R6 (see FIG. 2A) for fixing the fishing reel to a fishing rod.

The detailed structure and operation of the existing fishing reels, particularly, a bait reel are not described herein for the convenience.

In the side covers, a palm side cover, that is, a first side cover RC opens and closes holes for mounting the spool R3 with the shaft R2 on the frame R1.

A locker for helping the first side cover RC open and close the hole is provided.

The locker passes through the frame and the first side cover or through a second side cover Rc, the frame R1, and the first side cover RC, the structure shown in the figures corresponds to the latter, and the concept of a locking rod for locking and unlocking by moving forward and backward through the 'frame and the first side cover' in the specification and claims includes both cases.

Figure 5:
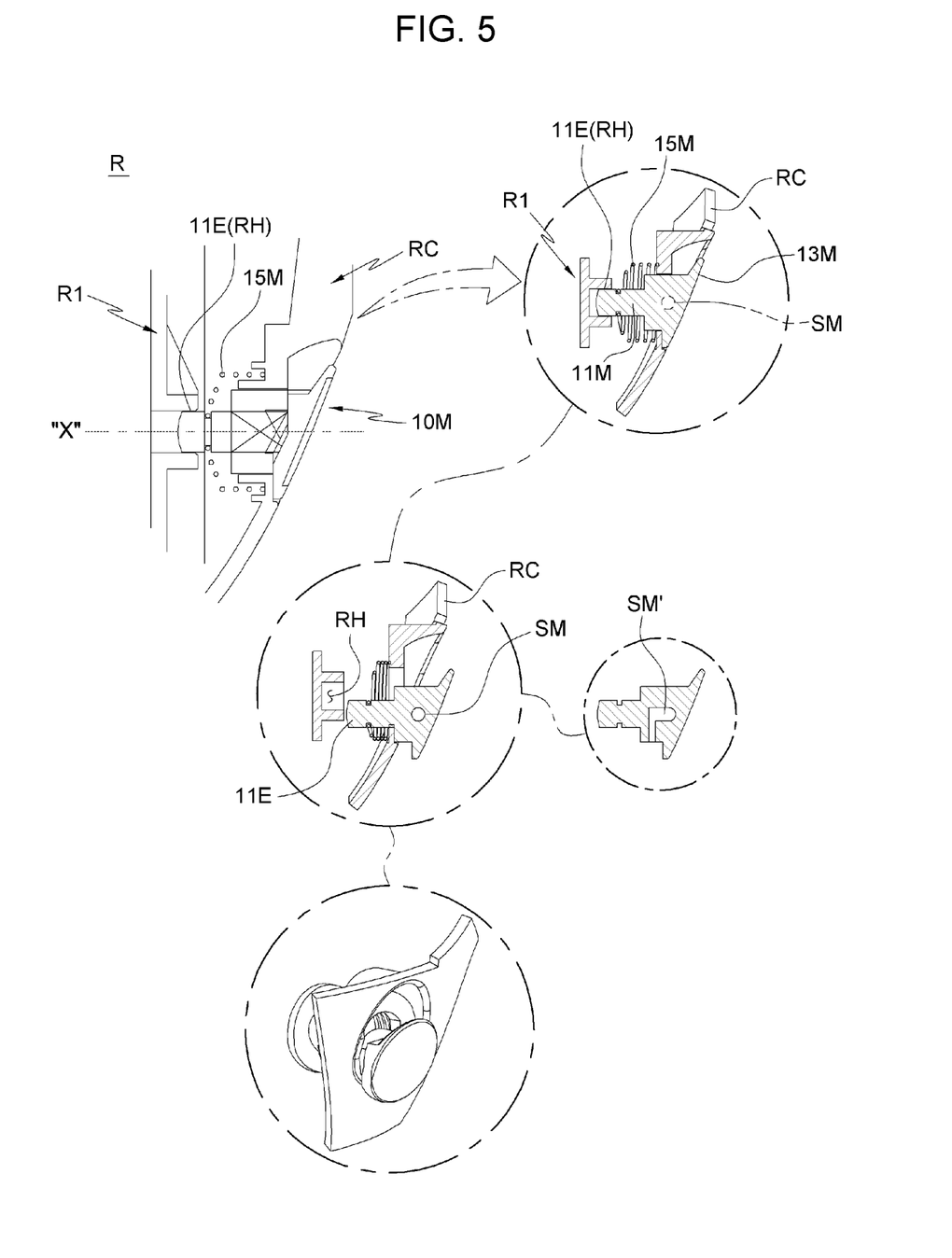
FIG. 5 is a view showing a hidden line stopper according to a modified embodiment of the present invention.

The concept of the former is shown in FIG. 5.

In the specification, the term 'the locker 10 passes through the second side cover Rc, the frame R1, or the first side cover RC' includes both cases that both ends pass through the them, and particularly, that a locking end 11e of the locking rod 11 is fitted therein.

As shown in the circle constructed by a dashed dotted line and showing the operation of the locker at the lower portion in FIG. 1, the locker 10 including the locking rod 11 further includes a grip 13, so when a user holds and pulls back (moves to the right) the grip 13, the locking end 11e of the locking rod 11 is separated from a locking hole Rh of the first side cover RC. Further, when a user rotates the first side cover about a specific axis (not shown), the side hole of the frame is opened.

In the structure shown in FIG. 1, unless external force is applied by a coil spring 15 for quick locking and unlocking, elasticity is applied in the forward direction in which the locking end 11e is inserted into the locking hole Rh of the first side cover RC.

If necessary, it may be possible to form a male thread on the locking rod of the locker with or without the coil spring 15 and form a female thread on the first or second side cover so that the first side cover can be maintained in a locked state by thread-fastening.

Further, the grip of the locker may be disposed at the first side cover and the locking end of the locking rod may be inserted in a locking hole formed at the frame.

The expression of a 'grip at a (the) first or a (the) second cover' in the specification and claims includes the locker structure with a grip shown in the figures and modified locker structures.

A line stopper S is the subject component of the fishing reel R of the present invention and various lockers 10 and line stoppers S are shown in FIGS. 2A to 4B (in FIGS. 2A to 4B, as for the reel R, other components except for the frame R1 and the side covers RC and Rc are not shown for the convenience, and as for the locker 10, other components including members for keeping a locked state such as the coil spring 15, except for the locking rod 11 and the grip 13 are not shown for the convenience). A user a user can hold the grip 13 at the second side cover Rc (or at the first side cover) and locks and unlocks the first side cover Rc by moving forward and backward the locking rod 11 disposed through the second side cover Rc, frame R1, and first side cover RC (or through the frame and first side cover). Accordingly, when a user moves backward the locking rod 11 to unlock the locker 10 and open the first side cover RC, the line stopper S is exposed and a line (a fishhook, if necessary) can be put into the line stopper and fixed therein (or a line that has been inserted in the line stopper S can be released).

After inserting the line, when the user locks the locker and closes the first side cover RC by moving forward the locking rod 11 using the grip 13, the line stopper S is hidden and the line is lightly stuck between the locking rod and the first side cover or between the locking rod and the frame. Further, when the user turns the spool R3 by turning the handle R4, the line can be wound tightly (under tension) on the spool.

The line stopper S of the present invention does not have an external or internal line fixer, but uses a locker, so there is no need for specific equipment or specific parts.

Accordingly, since the reel's part (locker) is employed, there is no possibility of loss of the part and there is no problem with increasing the size of the reel.

Further, since the line stopper is a hidden type and exposed to the outside only when a user fixes a line, it does not deteriorate the external appearance of a fishing reel while maintaining the functions of parts. Furthermore, there is no need for a knot and the line is not damaged or lost.

In addition, since a fishing line can be inserted into a line guide and fixed to the line stopper, it is possible to more conveniently resume fishing at a later time.

The line stopper S may be implemented in the type of a loop Sr or a hook Sh formed at the locking rod 11 of the locker 1, particularly, close to the grip 13.

Figure 2A:
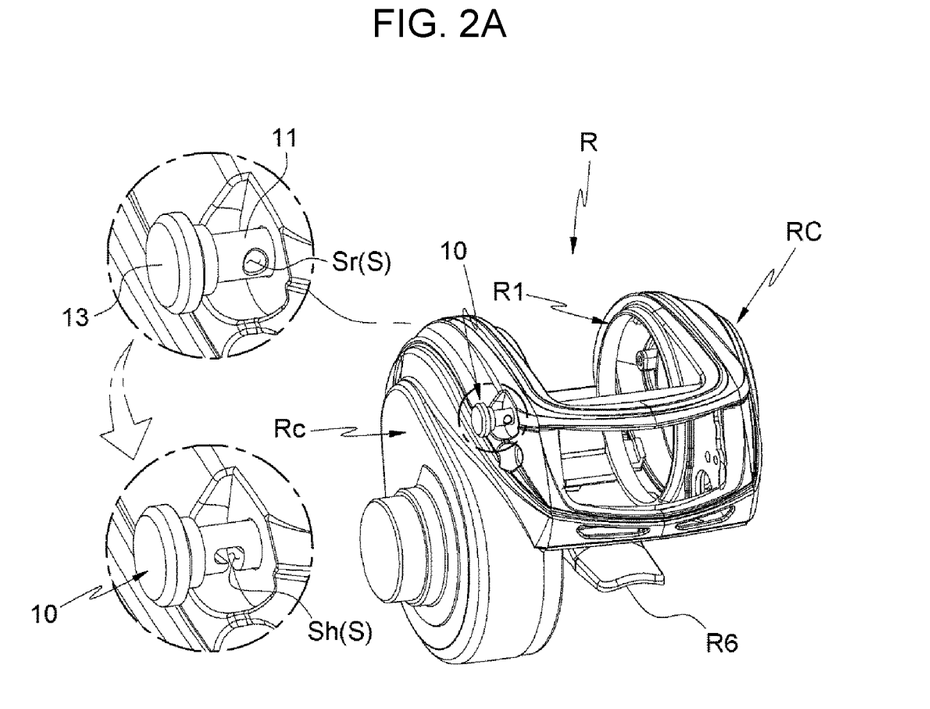
FIGS. 2A, 2B, 3A, 3B, 4A and 4B are perspective views of fishing reels with various hidden line stoppers and auxiliary line stoppers according to embodiments of the present invention.
Figure 3A:
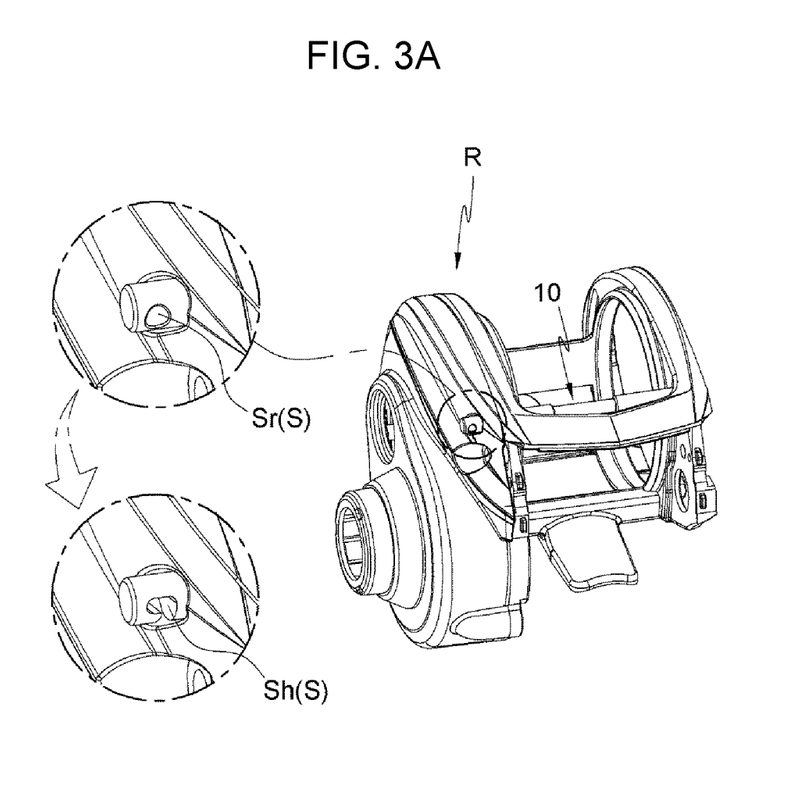
Figure 4A:
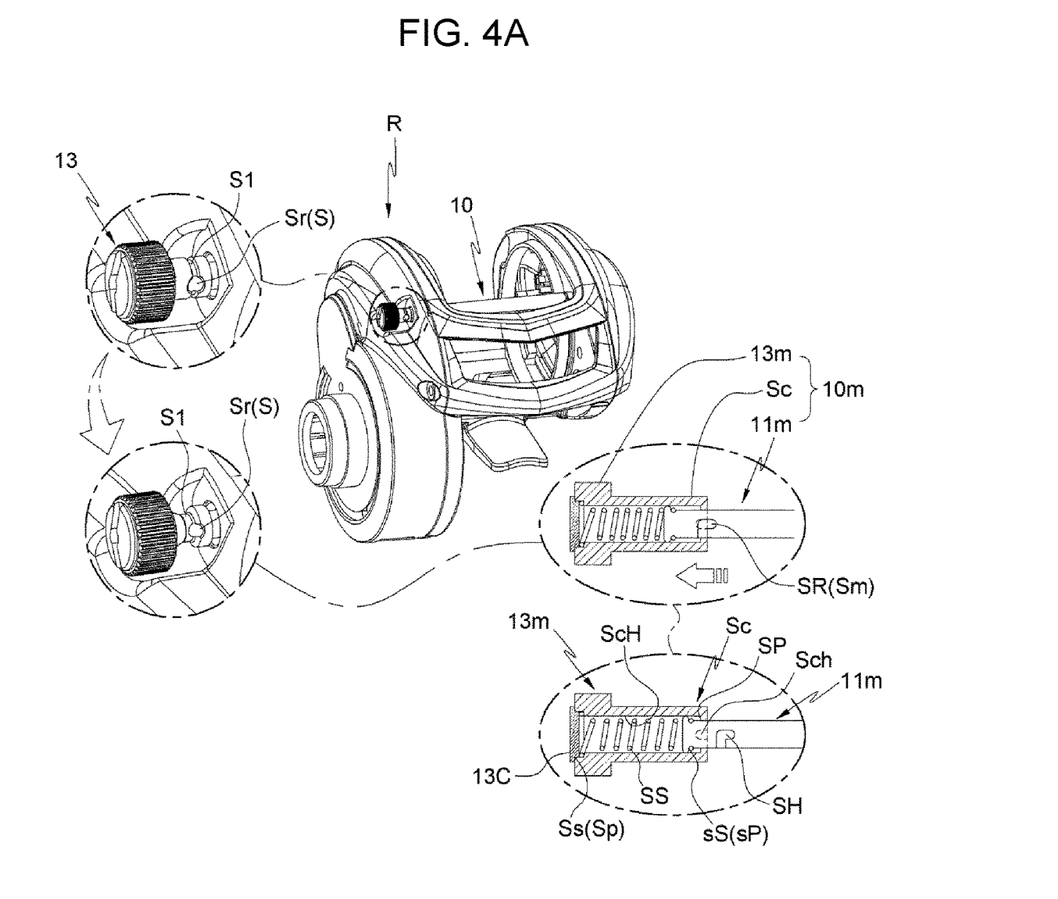

Loop type line stoppers Sr that are simple holes are shown in FIG. 1, in the circle constructed by a dashed dotted line at the left upper portion in FIG. 2A, in the circle constructed by a dashed dotted line at the left upper portion in FIG. 3A, and in the circles constructed by a dashed dotted line at the left upper and lower portions in FIG. 4A.

Further, hook type line stoppers Sh are shown in the circle constructed by a dashed dotted line at the left lower portion in FIG. 2A and in the circle constructed by a dashed dotted line at the left lower portion in FIG. 3A.

A hook type line stopper has the advantage of being capable of fixing a fishing line with the fishhook at the end, as compared with a loop type line stopper.

The hook type line stoppers Sh are open downward, so when a user couples the fishing reel S to a fishing rod, the reel is positioned under the fishing rod, so the openings of the hook type line stoppers face up, and accordingly, a line inserted into the hook type line stoppers Sh is prevented from coming out from the hook type line stoppers Sh due to its own weight.

Further, the openings are formed at a side (far from the grip 13) of the hook type line stoppers Sh, when a user takes his or her hand off the grip after inserting the line, the line is moved away from the openings, so it can be stably fixed.

On the other hand, as can be seen from FIG. 5, there is provided a locking rod 10M that includes a locking rod 11M having a locking end 11E inserted in a locking hole RH of a frame and has a grip 13M connected to the locking rod and disposed at the first side cover RC is employed (the locker is also elastically supported by a coil spring 15M).

In this case, a line stopper, particularly, a loop type line stopper SM or a hook type line stopper SM' may be provided close to the locking rod to be exposed so that a line (or a fishhook, if necessary) can be placed and fixed therein, when a user moves the locking rod 11M backward to unlock the locker 10M and open the first side cover RC (palm side cover).

Further, the line stopper S may have a circular groove S1 around the locking rod 11 at a position close to or overlapping the loop or the hook so that a line is stuck and prevented from being damaged in between the frame R1 or the side covers RC and Rc and the locker 10.

Figure 2B:
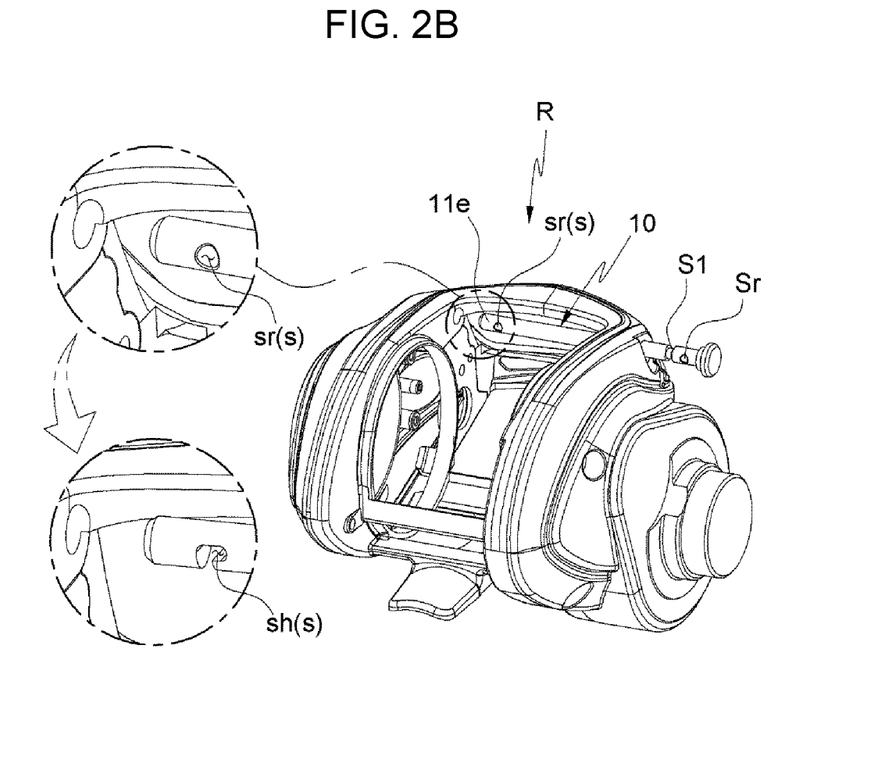

The circular groove S1 can be seen in FIG. 2B (not overlapping the line stopper) and FIG. 4A (overlapping the line stopper).

In particular, the circular groove is suitable for the case in which the locker 10 is thread-fastened to the frame R1 or the side covers RC and Rc (and accordingly, the grip 13 of the locker 10 shown in FIG. 4A has a knurled outer side and a groove for inserting a tool such as a flat-head screwdriver) and a line is wound and accumulated around the line stopper with rotation of the locker 10.

If necessary, the position (overlapping the line stopper or not), width, and depth of the circular groove can be variously adjusted.

Further, the locking rod has an auxiliary line stopper 's' spaced from the line stopper S, so a user can use the line stopper or the auxiliary line stopper, or both of them, if necessary, and accordingly selectivity for users is increased.

Figure 3B:
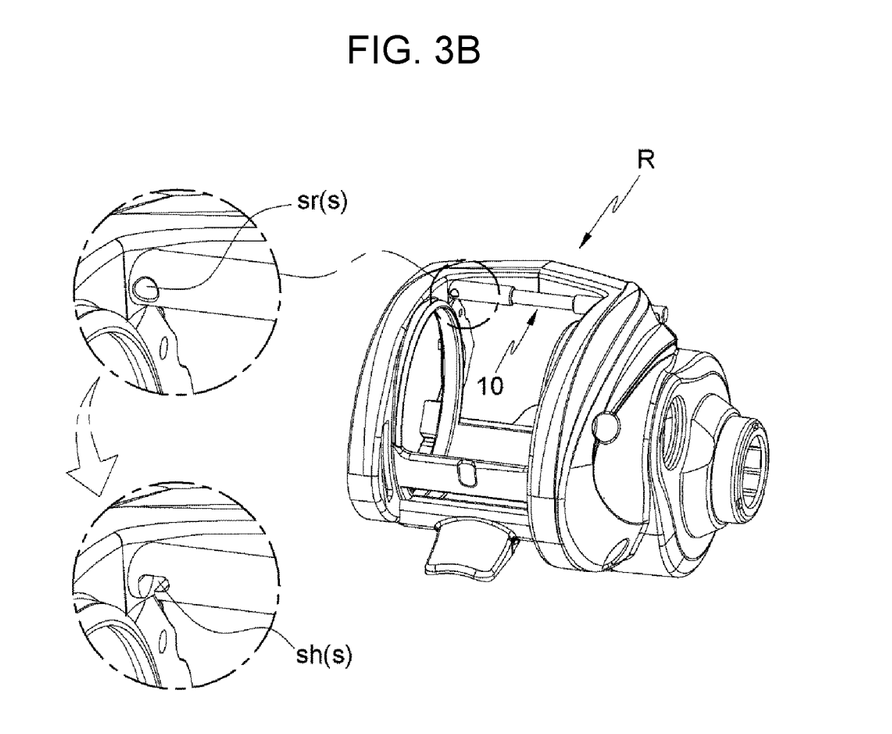
Figure 4B:
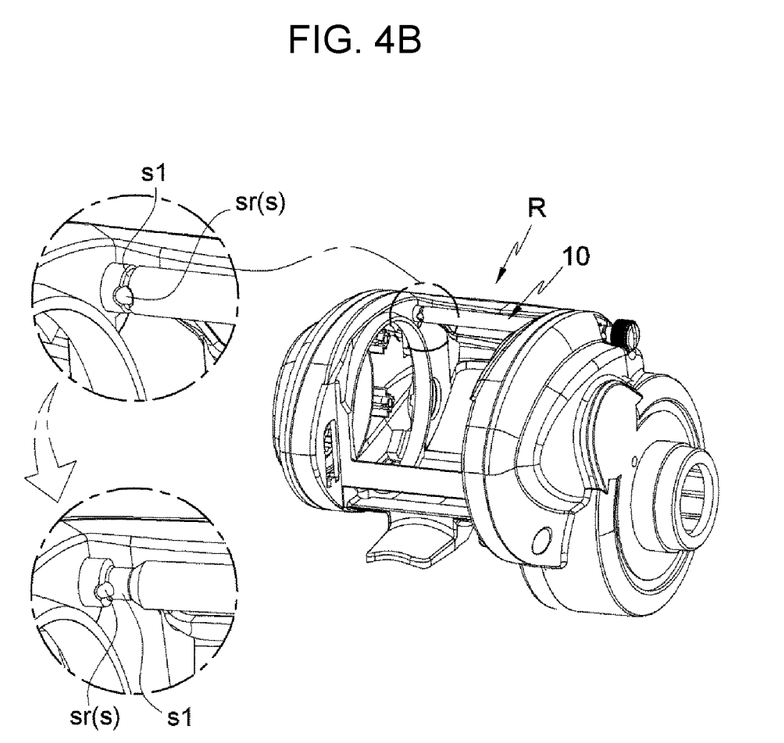

The auxiliary line stopper 's' can also be implemented in a loop type 'sr' (shown in the circle constructed by a dashed dotted line at the left upper portion in FIG. 2B, in the circle constructed by a dashed dotted line at the left upper portion in FIG. 3B, and the circles constructed by a dashed dotted line at the left upper and lower portions in FIG. 4B) or a hook type 'sh' (shown in the circle constructed by a dashed dotted line at the left lower portion in FIG. 2B and the circle constructed by a dashed dotted line at the left lower portion in FIG. 3B).

The auxiliary line stopper 's', for the same reason, may have a circular groove s1 (see the two circles at the left upper and lower portions in FIG. 4B) around the locking rod 11 at a position overlapping (or close to and not overlapping) the loop 'sr' or the hook 'sh'.

Further, the auxiliary line stopper 's' can also be hidden and exposed when the locking rod 11 is moved forward and backward to close and open the first side cover.

If necessary, the auxiliary line stopper may be configured to be always exposed regardless of movement of the locking rod to hold and fix a fishhook (the line stopper is used to fix a line with the fishhook).

A modified line stopper Sm is shown in the circles constructed at the right lower portions in FIG. 4A, in which the line stopper Sm has a combined structure of a loop type and a hook type.

In detail, a locking rod 11*m* and a grip 13*m* are separated in a modified locker 10*m*, in which a hook type line stopper SH is disposed at the grip-sided end of the locking rod 11*m*, the grip 13*m* in which an end of the locking rod is inserted has a cover Sc, and a closing recess Sch is formed in the cover at a position corresponding to the hook type line stopper SH.

When the locking rod 11*m* is inserted from the left side into a mounting hole ScH of the grip 13*m* for assembling, a locking portion sP at the left end of the locking rod is locked to a counter-locking portion SP formed on the inner side of the right end of the mounting hole.

A right coupling portion sS of a spring SS, which matches the recess ScH of the cover Sc with the hook type line stopper SH of the locking rod 11*m* to make a single loop SR, locks the locking portion sP of the locking rod 11*m*, so the spring is firmly fixed. Further, a left locking portion Ss of the spring SS is locked to the locking step Sp at the right end of the mounting hole ScH of the grip 13*m*, thereby regulating the shape of the combined the loop type line stopper SR.

The spring may be replaced by a positioning member.

After the spring SS is inserted, the left opening of the mounting hole ScH is closed by coupling (thread-fastening or forcibly fitting) a cap 13C.

When the grip 13*m* is pulled, the locking rod 11*m* is moved backward to open the first side cover, the spring SS is stretched, and the cover Sc of the grip is also moved left (backward).

Accordingly, the recess ScH of the cover Sc is separated from the hook type line stopper SH of the locking rod 11*m* and the opening is exposed.

Further, the counter-locking portion SP of the grip 13*m* comes in contact with the locking portion sP at the left end of the locking rod 11*m*, so the grip cannot be moved any longer.

As a result, the hook type line stopper SH is exposed outside the second side cover.

The modified line stopper Sm can provide the advantages of both the loop type and the hook type and this structure can be applied to an auxiliary line stopper, if necessary.

Although the configuration relating to fishing reels, particularly, a bait reel known in the art was not described above, those skilled in the art can easily estimate, infer, and implement the configuration.

Although a fishing reel which has a specific shape and structure was described above with reference to the accompanying drawing, the present invention may be changed and modified in various ways by those skilled in the art and those changes and modifications should be construed as being included in the scope of the present invention.

What is claimed is:

1. A fishing reel comprising:
   a frame;
   a shaft mounted on the frame;
   a spool fitted on the shaft to keep a fishing line wound thereon;
   a first side cover disposed at a side of the frame and capable of opening to separate the spool;
   a second side cover coupled to the frame at the opposite side to the first side cover;
   a locker having a locking rod for locking and unlocking by moving forward and backward through the frame and the first side cover and a grip disposed at the first or second side cover and connected to the locking rod; and
   a line stopper formed at the locking rod to be hidden or exposed when the locking rod is moved forward and backward to open and close the first side cover,
   wherein the line stopper includes a loop or a hook formed at the locking rod.

2. The fishing reel of claim 1, wherein the line stopper further includes a circular groove formed around the locking rod at a position close to or overlapping the loop of the hook.

3. The fishing reel of claim 1, further comprising an auxiliary line stopper spaced from the line stopper at the locking rod.

4. The fishing reel of claim 2, further comprising an auxiliary line stopper spaced from the line stopper at the locking rod.

* * * * *